F. CONRAD.
STARTING AND IGNITION MACHINE.
APPLICATION FILED JAN. 30, 1914.
1,237,172.
Patented Aug. 14, 1917.
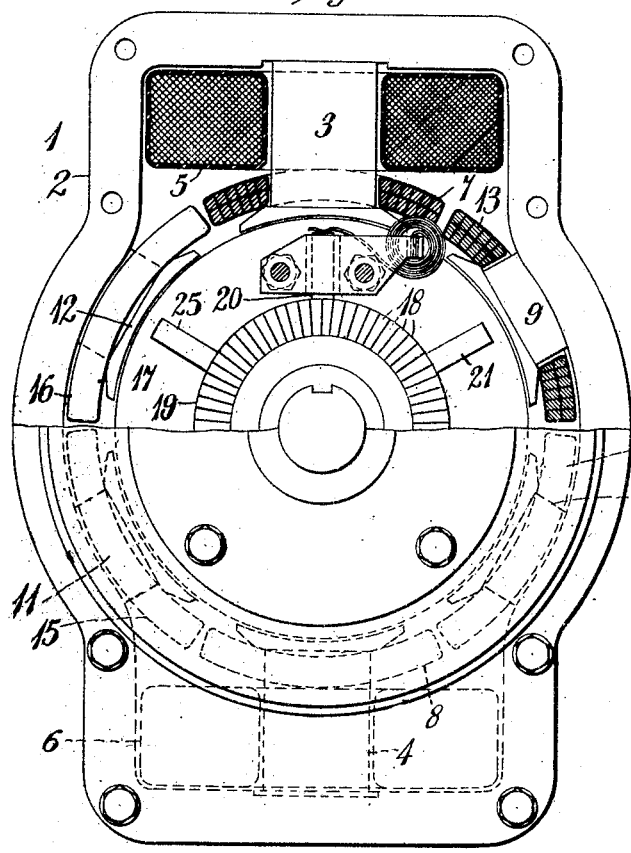
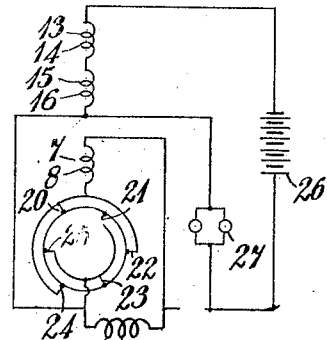
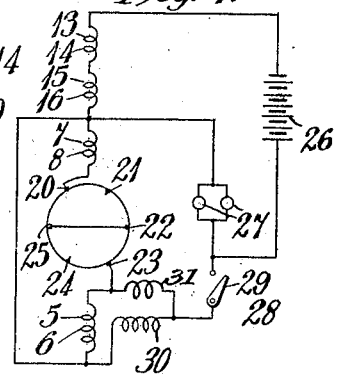
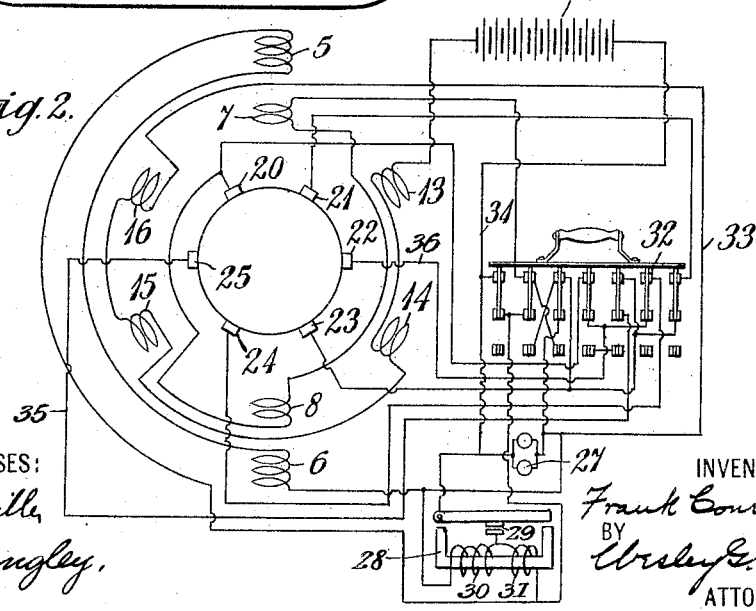
WITNESSES:
Fred H. Miller
J. R. Langley
INVENTOR
Frank Conrad
BY
Wesley G. Carr
ATTORNEY

UNITED STATES PATENT OFFICE.

FRANK CONRAD, OF PITTSBURGH, PENNSYLVANIA, ASSIGNOR TO WESTINGHOUSE ELECTRIC AND MANUFACTURING COMPANY, A CORPORATION OF PENNSYLVANIA.

STARTING AND IGNITION MACHINE.

1,237,172.          Specification of Letters Patent.      Patented Aug. 14, 1917.

Application filed January 30, 1914. Serial No. 815,355.

*To all whom it may concern:*

Be it known that I, FRANK CONRAD, a citizen of the United States, and a resident of Pittsburgh, in the county of Allegheny and State of Pennsylvania, have invented a new and useful Improvement in Starting and Ignition Machines, of which the following is a specification.

My invention relates to dynamo electric machines such as are adapted to be employed in connection with internal combustion engines and particularly to dynamo-electric machines that are adapted to operate either as motors or as generators.

My invention has for its object to provide a dynamo-electric machine which may operate as a motor, for example, to start the gas engine of an automobile and which may then be operated by the engine, at a variable speed, to generate an electromotive force having a substantially constant value.

In electrical systems, as at present arranged, it is usually necessary to provide complicated controlling devices, such as regulators or resistors, controlled by relay switches to prevent the voltages of generators that are employed in connection with automobiles from becoming excessive when driven at high speeds.

I provide a dynamo-electric machine which may be operated as a series motor for starting the gas engine of an automobile and which may then be operated as a constant-voltage generator for charging a storage battery and supplying current for ignition and lighting systems.

It is well known that, in the operation of an ordinary generator, the armature reaction magnetizes the armature to produce a magnetic field having an axis that is displaced by 90 electrical degrees from the axis of the primary magnetic field in the direction of rotation. The magnetic field produced by the armature reaction is known as the secondary field and is utilized in the present invention. The armature winding employed in my invention may be either that of the well known drum type or of the Gramme ring type. The main brushes are placed at the points which, in an ordinary generator, would be equipotential and no current would flow between them. However, if brushes be placed at or near the points of greatest potential difference and these brushes are short-circuited, a current will flow between them which magnetizes the armature about an axis that is displaced in the direction of rotation by 90 electrical degrees from the axis of the primary field. A difference of potential between the main brushes will be produced by the armature reaction or secondary field, and current, which may be termed the main current, will flow between them through the outer mains. The main current produces a tertiary field in the armature, the axis of which is displaced by 90 electrical degrees relatively to the axis of the secondary field and by 180 electrical degrees relatively to the axis of the primary field. The current between the short circuited brushes is normally less than the main current, and only a small portion of the effective primary field is necessary to produce it. If the resistance of the main circuit is not excessive, the main current automatically reaches such a value that the tertiary field is nearly equal to the primary. It will be clear, therefore, that the main or effective current operates to oppose the primary field and that an increased current through a circuit, as, for example, one containing electric lamps and a storage battery, tends to weaken the primary field and thereby automatically opposes an increase in the voltage of the generator.

The details of my invention will be described in connection with the accompanying drawings in which Figure 1 is an end view, partially in elevation and partially in section, of a dynamo-electric machine constructed in accordance with my invention. Fig. 2 is a diagrammatic view of circuits and apparatus embodying my invention. Fig. 3 is a diagrammatic view of the circuits of the dynamo-electric machine when operating as a motor. Fig. 4 is a view, similar to Fig. 3, of the electrical circuits as arranged for operation as a generator.

Referring particularly to Fig. 1, a dynamo-electric machine 1 comprises a field magnet frame 2 having connected thereto two oppositely disposed pole pieces 3 and 4. The pole pieces 3 and 4 are respectively provided with coils 5 and 6 of a shunt field winding and with coils 7 and 8 of a series field winding. Between the pole pieces 3 and 4, and equidistant therefrom and from each other, are four pole pieces 9, 10, 11 and 12 that are respectively provided with coils 13, 14, 15 and 16 of a series field winding, the coils being diagrammatically shown in Fig. 2. The armature 17 may be provided with a suitable winding (not shown), such as one of the drum type or of the Gramme ring type, that is connected in the usual manner to the bars 18 of the commutator cylinder 19. Six brushes 20, 21, 22, 23, 24 and 25 are provided, brush 20 only being shown in detail, but all of them being shown diagrammatically in Fig. 2.

The arrangement of the several field magnet coils and the various circuits of the dynamo-electric machine are diagrammatically shown in Fig. 2, reference to which may now be had. A storage battery 26 furnishes current for operating the dynamo-electric machine as a motor and is charged when the dynamo acts as a generator. A lighting system, which may be a part of the generator load, comprises incandescent lamps 27. The main circuit of the generator is controlled by reverse current relay switch or cut out 28 comprising a switch member 29 and coils 30 and 31 that are in shunt and series, respectively, with the armature. The cut out 28, the details of which form no part of my present invention, operates automatically to close the charging circuit of the generator when a predetermined voltage is reached, and to prevent current from flowing in a reverse direction through the generator. A change-over switch 32 operates, in the position illustrated, to effect the electrical connections for operation of the dynamo as a motor, and in the other closed position, for operation as a generator. Schematic arrangements of the circuits for the respective operations are shown in Figs. 3 and 4.

When the switch is in the position illustrated, a circuit will be completed that extends from the positive terminal of the battery through series field magnet coils 13, 14, 15 and 16 and conductor 33, thence through the switch 32 and conductors in parallel relation, brushes 21, 23 and 25, armature windings and brushes 20, 22, and 24, thence through conductors in parallel relation and the switch 32, field magnet coils 8 and 7, switch 32 and conductor 34 to the negative terminal of the battery. The shunt field windings 5 and 6 are included in a circuit extending from the battery through series field-magnet coils 13, 14, 15 and 16, conductor 33, shunt field-magnet windings 6 and 5, switch 32 and conductor 34 to the other terminal of the battery.

Because of the low resistance of the armature circuit comprising the series field-magnet windings, a heavy current traverses the circuit. A relatively small current traverses the shunt field-magnet windings 5 and 6 and the number of ampere-turns of the latter windings, which energize two only of the six poles, is small in comparison with that of the series field-magnet windings. The shunt field-magnet windings and the series field-magnet windings are arranged to assist each other under the conditions above described. The characteristics of the dynamo are, therefore, those of a series motor. The dynamo now operates, at a relatively high speed, substantially as a 6 pole series motor and may be employed to start the gas engine of an automobile. The lamps 27 are supplied from the battery during the operation of the dynamo as a motor.

When the switch 32 is in the generator position, the charging circuit extends from the brush 20 through the field magnet coils 8 and 7, switch 32, conductor 33, field magnet coils 16, 15, 14 and 13, battery 26, conductor 34, switch member 29, coil 31 and switch 32 to the brush 23. The shunt field windings 5 and 6 are included in a circuit extending from the brush 20, through series field coils 8 and 7, switch 32, shunt field coils 6 and 5, and switch 32 to brush 23. The coil 30 of the cut out 28 is in parallel relation with the shunt field coils 6 and 5.

The brushes 25 and 22 are short-circuited by conductors 35 and 36 that extend from the respective brushes to connected contact members of the switch 32. While the brushes 25 and 22 are not 90 electrical degrees from the main brushes 20 and 23, respectively, the effect is substantially the same as that described above in connection with the effect of a secondary field and short-circuited brushes. The brushes 21 and 24 are inactive and the dynamo-electric machine operates as a bipolar generator.

During the operation of the dynamo as a generator, the value of the current traversing the series field-magnet windings is very small and the direction of the current is reversed. The shunt field-magnet windings, which are connected across the terminals of the generator, constitute the main magnetizing windings, while the series field-magnet windings serve as demagnetizing or regulating windings. The number of ampere-turns of the series field-magnet windings is small in comparison with that of the shunt field-magnet windings during the operation of the dynamo as a generator. The series field-magnet coils 7 and 8, which are wound upon the main poles 3 and 4, are traversed by the entire current traversing the armature circuit, while the coils 13, 14, 15 and 16 carry only the current supplied to the battery. The poles corresponding to the latter group of coils are, therefore, substantially inactive during the operation of the dynamo as a generator.

The lamps 27 are across the line and are supplied from the battery until the generator voltage has reached a value such that the shunt coil 30 is sufficiently energized to close the cut out 28 and thereby complete the charging circuit. The series coil 31, which is then energized, acts as a holding coil to assist the coil 30. When the current tends to reverse its direction of flow through the coil 31, its force opposes that of the coil 30, and the charging circuit is broken. During normal operation of the generator, the voltage is substantially constant at variable speeds because it is self-regulating, as described above.

The advantages of a machine constructed in accordance with my invention are that it possesses a high torque in starting a gas engine because it operates at a high speed as a series motor. When it operates as a generator, it is self-regulating, thus avoiding the employment of expensive regulating or controlling devices. The use of separate units is avoided by combining a motor and a generator in a single machine.

I claim as my invention:

1. In a dynamo-electric machine, the combination with an armature, series field-magnet windings and shunt field-magnet windings, of means for controlling the connections of said windings for the operation of said dynamo-electric machine as a motor with the shunt field-magnet windings excited to a relatively low degree and for the operation of said dynamo-electric machine as a compound-wound generator having a different number of poles from that when operating as a motor.

2. In a dynamo-electric machine, the combination with a plurality of polar projections, a series field-magnet coil upon each of said projections, and shunt field-magnet coils upon a part of said projections, of means for arranging the connections of said coils for the operation of said dynamo-electric machine as a motor and for the operation of said dynamo-electric machine as a compound-wound generator having poles corresponding in number to that of the polar projections provided with shunt field-magnet coils.

3. In a dynamo-electric machine, the combination with a plurality of main poles, a plurality of auxiliary poles, a series field-magnet coil upon each of said poles, and a shunt field-magnet coil upon each of said main poles, of a controller having one position in which the coils are connected for the operation of said dynamo-electric machine as a motor and a second position in which the coils are arranged for the operation of said dynamo-electric machine as a compound-wound generator having poles corresponding in number to that of the main poles.

4. In a dynamo-electric machine, the combination with an armature and a plurality of field magnet coils, of means for controlling said armature and said coils to operate said machine either as a motor or as a generator with a different number of poles and having a primary magnetic field and a magnetic field opposed to the primary field.

5. In a dynamo-electric machine, the combination with an armature, and a plurality of field-magnet coils, of controlling means for arranging the connections of said armature and field-magnet coils for the operation of said dynamo-electric machine either as a motor or as a generator having a primary magnetic field and a magnetic field for opposing said primary magnetic field in accordance with the current traversing the supply circuit of said generator, said controlling means operating also to change the number of poles simultaneously with the arrangement of the connections of the armature and field-magnet coils.

6. In a dynamo-electric machine, the combination with a multipolar field magnet comprising main and auxiliary poles, an armature having commutator brushes corresponding in number to the field magnet poles, and a main circuit for said machine, of means for connecting said main circuit either to all of said brushes for operation as a motor or to one pair of said brushes and, at the same time, short-circuiting a second pair of brushes and rendering said auxiliary poles substantially inactive for operation as a generator.

7. In a dynamo-electric machine, the combination with an armature, a plurality of pairs of commutator brushes and a main circuit for said machine, of means for connecting said main circuit either to all of said brushes or to one pair of them and, at the same time, short-circuiting another pair of brushes and changing the number of active field magnet poles.

8. In a dynamo-electric machine, the combination with a multipolar field magnet, an armature having commutator brushes corresponding in number to the field-magnet poles, and a main circuit for said machine, of means for connecting said main circuit either to all of said brushes for operation as a motor or to one pair of said brushes and, at the same time, short-circuiting a second pair of brushes and changing the number of poles for the operation of said dynamo-electric machine as a generator.

9. In a dynamo-electric machine, the combination with an armature, a plurality of field magnet poles, a series field winding, a shunt field winding and a plurality of pairs of commutator brushes, of a switch for controlling the circuits of said machine, said switch operating, when in one position, to connect said series field winding in circuit with all of said brushes and, when in a second position, to connect said shunt field winding and said series field winding in circuit with one pair of said brushes and to short circuit a second pair of said brushes.

10. In a dynamo-electric machine, the combination with a field-magnet yoke having a plurality of polar projections and series field-magnet windings therefor, of means for connecting all of said field-magnet windings in series-circuit relation to energize all of said poles for operation as a motor and for connecting parts of said field-magnet windings in different circuits for operation as a generator having a smaller number of poles.

In testimony whereof, I have hereunto subscribed my name this 24th day of Jan., 1914.

FRANK CONRAD.

Witnesses:
WILLIAM BRADSHAW,
B. B. HINES.

Copies of this patent may be obtained for five cents each, by addressing the "Commissioner of Patents, Washington, D C."